Feb. 25, 1964 E. J. SMITH 3,122,733

ANALOG TO DIGITAL CONVERTER AND FUNCTION GENERATOR

Filed Oct. 21, 1959 4 Sheets-Sheet 1

EDGAR J. SMITH
INVENTOR.

BY [signature]
Sidney G. Faber
ATTORNEYS

Feb. 25, 1964 E. J. SMITH 3,122,733

ANALOG TO DIGITAL CONVERTER AND FUNCTION GENERATOR

Filed Oct. 21, 1959 4 Sheets-Sheet 2

EDGAR J. SMITH
INVENTOR.

BY

Sidney G. Faber
ATTORNEYS

| BINARY | DECIMAL |
|---|---|
| 111111111 | 511 |
| 111111111 | 511 |
| 111110100 | 500 |
| 110101101 | 429 |
| 101110111 | 375 |
| 101001101 | 333 |
| 100101100 | 300 |
| 100010000 | 272 |
| 011111010 | 250 |
| 011100110 | 230 |

EDGAR J. SMITH
INVENTOR.

BY
Sidney G. Faber
ATTORNEYS

EDGAR J. SMITH
INVENTOR.

BY Sidney G. Faber
ATTORNEYS 3,122,733

ANALOG TO DIGITAL CONVERTER AND FUNCTION GENERATOR

Edgar J. Smith, Verona, N.J., assignor to General Precision, Inc., a corporation of Delaware Filed Oct. 21, 1959, Ser. No. 847,790
3 Claims. (Cl. 340—347)

Figures 1, 2:
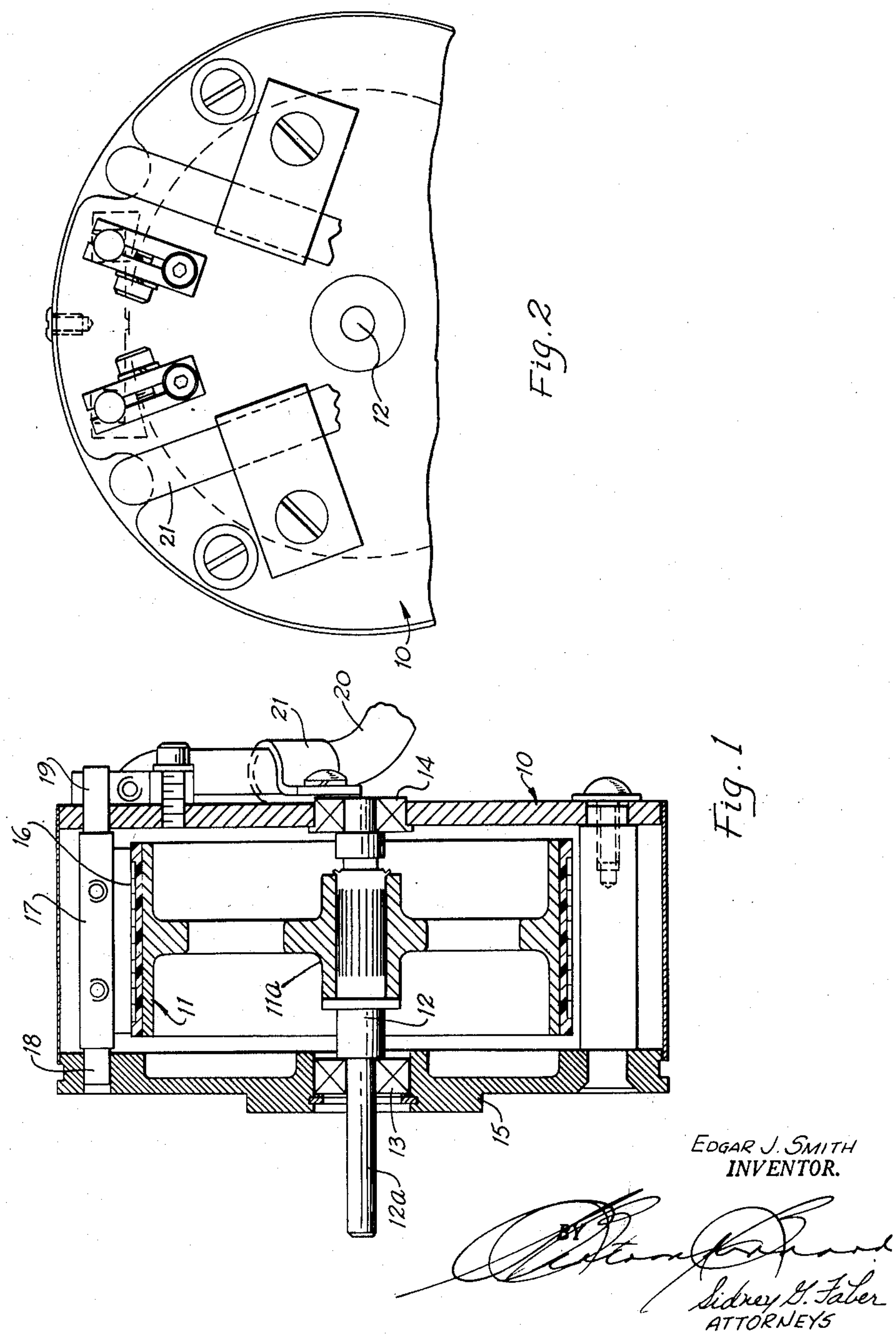

This invention relates generally to analog-to-digital converters, and although the invention is not limited to such application, it is particularly concerned with converters for producing digital impulses representing the rotative position of a shaft, or other movable member, or a mathematical function thereof.

In one type of converter for performing this general function it is known to provide a rotatable drum or commutator device having code markings thereon in digital number form about its periphery, together with a single row of fixed brushes or other sensors for detecting the different markings as the drum is rotated thereby, and producing a plurality of impulses representative thereof. The code markings on the drum at each angular position vary from those at other positions in a predetermined fashion whereby as the drum is rotated according to the analog input quantity, the digital impulses being generated by the brushes likewise vary in a predetermined fashion to provide the desired analog to digital conversion.

Although such converters may operate in any desired numbers system such as the decimal, trinary or other, compatibly with the needs of the computer or other device receiving the digital impulses therefrom, many simplifications are realized when operating in the binary numbers system or in one of the many coded systems based upon the binary radix since these systems require merely on-off switching devices wherein each order or place of the digital number is represented by only two conditions or states.

However, when operating in the binary or other low radix number system, each number is represented by a large number of bits or places and to change from one number to another generally requires a change in the condition of a number of such places. For example, in changing the number represented in decimal form as 7 to the next succeeding higher number 8, only one digit place is varied. On the other hand the decimal number 7 occupies four places in binary form or 0111 and the next succeeding number 8 appears in binary form as 1000. Consequently to change from number 7 to number 8 in the binary numbers system requires a change in all four places of the binary number. For this reason difficulties are often met in known converter devices in switching from one number to the other without error, and it is oftentimes necessary to resort to elaborate and complex mechanisms to eliminate the increased possibility of error as the drum or commutator is rotated.

In addition, when converting an analog quantity into the binary numbers system or other system having a large number of bits or places, errors or ambiguities often occur if the converter happens to be interrogated at an instant or position on the drum when the brushes are sensing a change in the number code. If, in the binary system, for example, the brush is partially detecting a zero (0) code marking, the brush will generally read out a one (1) signal even if the correct marking to be detected is a zero (0) or off condition. In fact, if the brush senses the code markings by means of electrical conduction, it will only indicate a zero (0) condition when the brush is coincidently centered on an insulating code area and no portion thereof contacts an electrically conductive area.

To overcome these errors and ambiguities according to the present invention, there is provided what may be termed a position register control means for insuring that the brushes are always coincidently centered with respect to the code markings on the movable member during readout, whereby the digital signals being transmitted by the brushes or other sensors cannot be in error and the converter may be interrogated at any time. To provide this function there is employed an additional position code marking on the movable member and an additional brush or other sensor for determining the correct positioning of the drum at all times. Cooperating with this additional sensor and code marking, there is also provided an additional series of brushes or sensors for reading the digital number code markings on the movable member, whereby the digital number code markings are detected or sensed twice for each different location of the member. The pairs of brushes for reading the digital numbers are offset from one another and from the position registry sensor and there is provided a logic circuit for responding to all these positions sensed in such predetermined manner that the digital signals being transmitted by the converter are not subject to ambiguity or error caused by switching but rather are taken at predetermined positions with respect to the movable member to eliminate such errors.

It is accordingly a primary object of the invention to provide an analog-to-digital function generator that is not subject to ambiguity or error in reading out the digital function.

A more specific object is to provide such a generator having position register control means for insuring freedom from error and ambiguity during switching from one digital number to another.

A still further object is to provide such a generator that may be operated at different speeds without error.

Still another object is to provide such a generator of small size and weight, low momentum and great accuracy.

Figure 3:
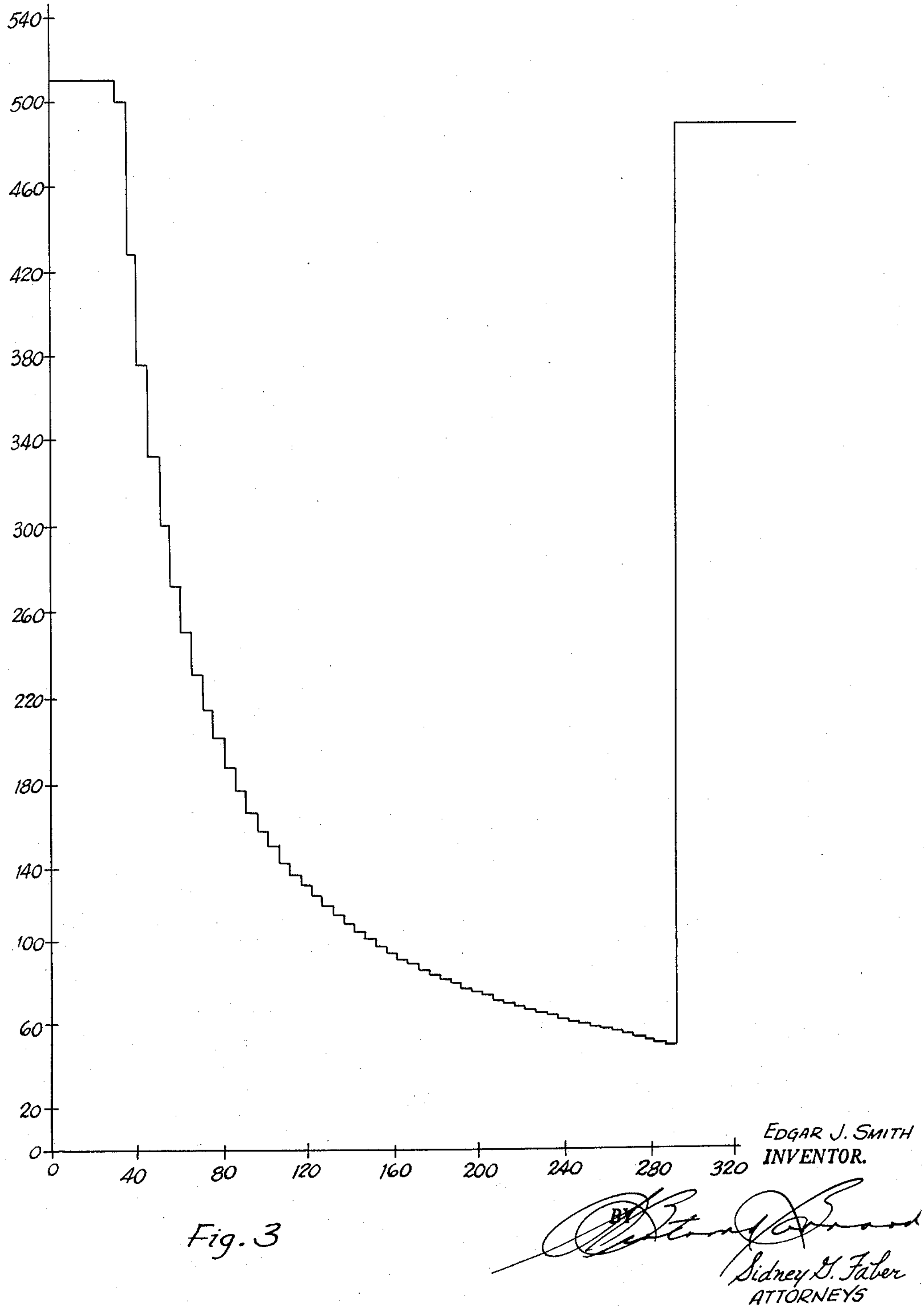
Figures 4A, 4B:
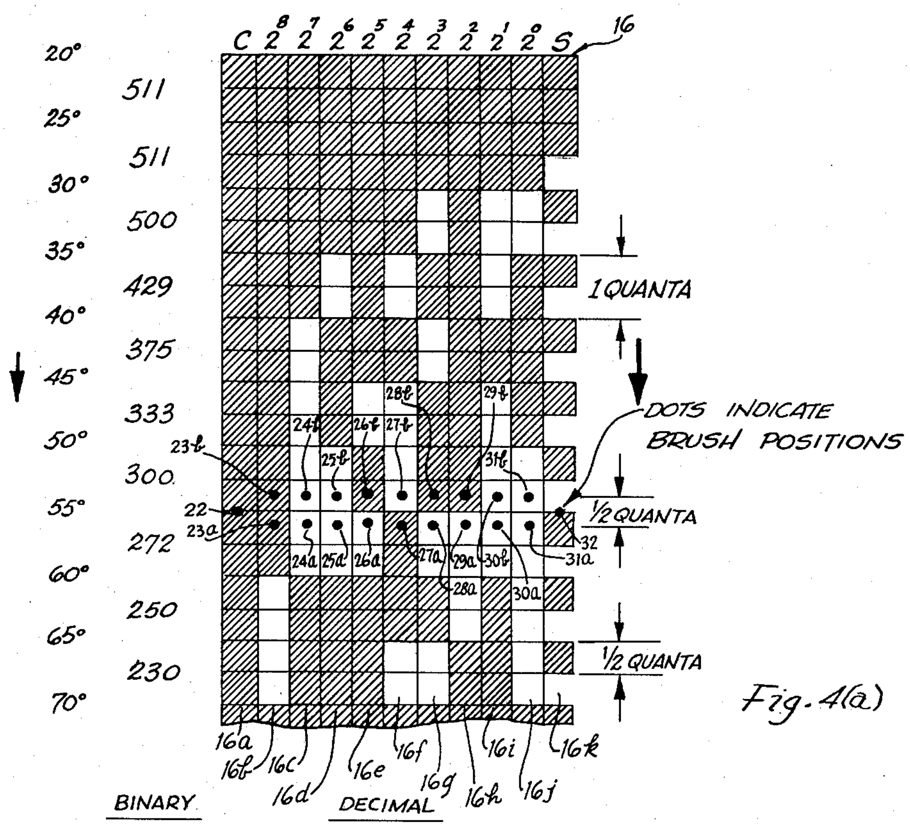
Figure 5:
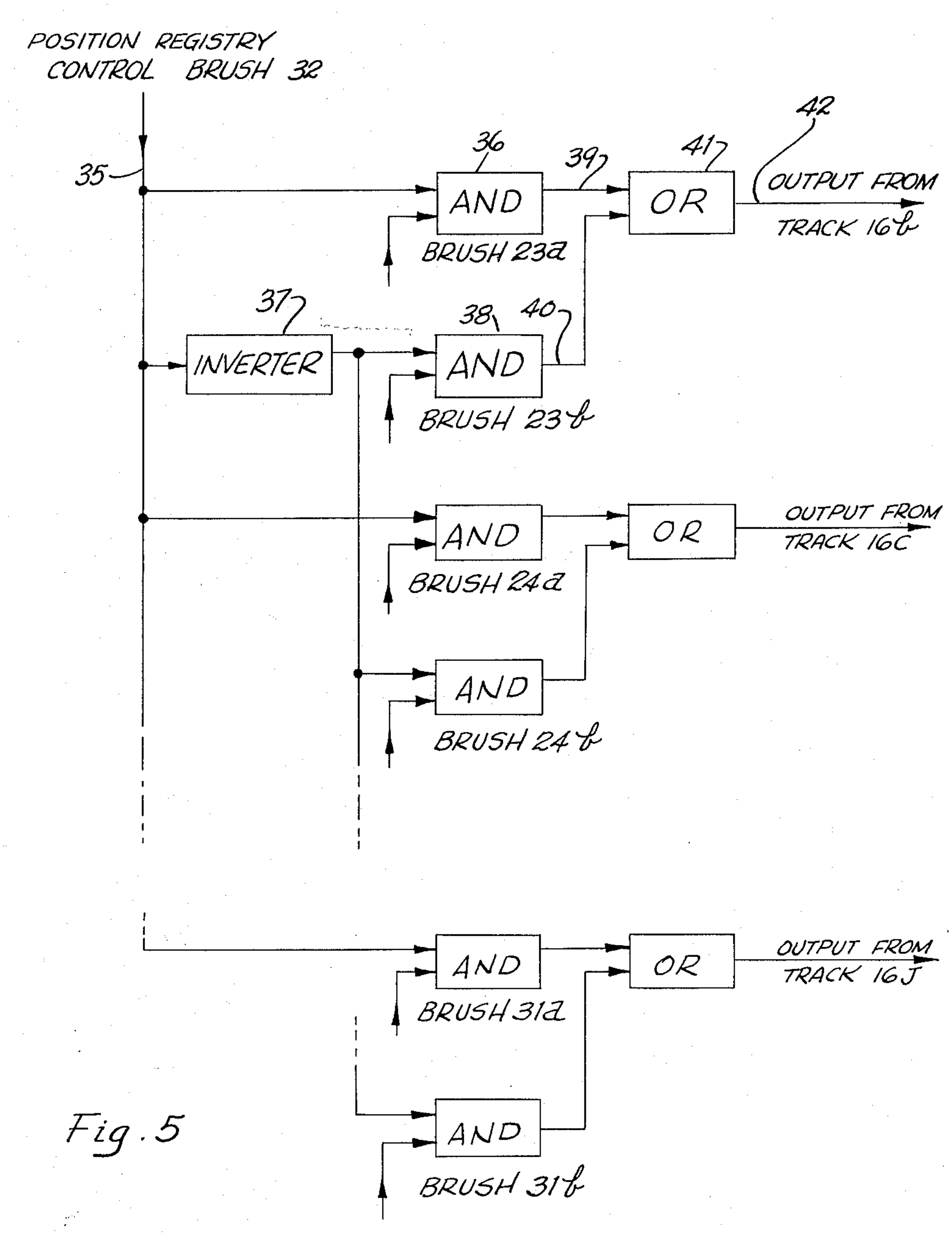

Other objects and many attendant advantages will be more readily comprehended by those skilled in the art after a detailed consideration of the following specification taken with the accompanying drawings wherein:

FIGURE 1 is a longitudinal sectional view of one preferred embodiment according to the present invention, FIGURE 2 is an end view showing certain details of the outer housing, shown in FIGURE 1, FIGURE 3 is a plotted curve illustrating one non-linear mathematical function that may be transmitted in digital form according to the present invention, FIGURE 4(*a*) is a representation of a predetermined coding to generate the non-linear function of FIGURE 3 in binary number form, FIGURE 4(*b*) is a tabulation of the decimal numbers represented by the coded pattern of FIGURE 4(*a*) and the corresponding binary numbers, and FIGURE 5 is a block diagram representation of a preferred logic circuit employed with the converter for position registry control to eliminate errors and ambiguities in reading out the digital signals.

Referring now to the drawings for a detailed consideration of one preferred embodiment of the invention, there is shown in FIGURES 1 and 2, a hollow outer housing 10 in the general form of a cylinder, as shown, and containing therein a cylindrical drum member 11. The drum 11 is centrally fastened to a shaft 12 passing through a hub portion 11*a* thereof and being suitably mounted on anti-friction bearings 13 and 14 supported in the end walls of the housing for rotation within the housing 10. The cylindrical portion of the shaft 12 fitted to the hub 11*a* may be knurled, keyed, or otherwise fixedly attached to the hub 11*a* of the drum member 11. The shaft 12 has an integral, axially extending portion 12*a* projecting through the front wall 15 of the housing 10 and accessible from outside the housing whereby the shaft 12 is adapted to be rotatably positioned from outside the housing, according to the input analogue function to be converted into digital, or decimal, form and thereby rotatably position the drum 11 inside the housing 10.

About the outer peripheral surface of the drum 11, there is provided a predetermined mark-space code, generally identified as 16, and preferably comprising a plurality of electrically conducting and nonconducting areas located in such a predetermined pattern as to provide the desired different digital number representation along different peripheral positions on the drum as will be more fully described hereinafter. Such a conducting, nonconducting code may be likened to an electrically conducting continuous surface having a plurality of "islands" of non-conducting material located at predetermined positions thereon. One preferred manner of forming such a code pattern is by an engraving process. The code pattern may also be formed by embedding or otherwise molding into the surface of a drum, of a plastic material, thin metal rings or ring sections, cut out in such a manner as to provide the mark-space pattern required, the rings or ring sections being fabricated by machining or other suitable means. However, other techniques for forming the desired electrically conductive code are known, such as for example, embedding a plurality of circular metal segments of different arcuate lengths about the outer surface of the drum and flush therewith together with properly placed insulating segments, which may be integral with the drum.

To detect or scan these varying code markings as the drum is rotated according to the analogue signal turning the input shaft 12, there are provided rows of conducting brushes (not shown in FIGURES 1 and 2) fixedly mounted within the housing transversely along the surface of the drum and adapted to make electrical contact with the peripheral surface of the drum 11, thereby to sense or detect the code markings thereon. As shown in FIGURE 1, these rows of brushes may be supported by a suitable holder 17 having end portions 18 and 19 thereof mounted in the end walls of the housing 10. Each of these brushes (not shown) is insulated from the others and provided with a separate insulated electrical connecting wire (not shown) passing from the brush and through the holder 17 to fasten with other wires in an insulated cable 20, which, as shown, may be rigidly supported by the housing 10 by means of a clamp 21.

As thus far described, therefore, there is provided a rotatable drum having an electrically conducting code over the peripheral surface thereof bearing a predetermined series of digital numbers with the same or a different digital code number being located at each incremental surface portion of the drum, together with rows of substantially stationary brushes for electrically contacting the drum to detect the different code markings for each rotative position of the drum.

For purposes of illustrating one embodiment of the invention, one such code marking is shown in FIGURE 4(*a*) for generating the function $$Y=\frac{3}{A}$$

where the letter Y represents the digital output signal obtained from the converter brushes and the letter A represents the angular displacement of the shaft 12 on the input analogue quantity to be converted. This inverse function is plotted in FIGURE 3, where the ordinate represents the magnitude or digital number being generated by the converter and the abscissa represents the angular displacement of the drum from a zero starting position.

As shown in FIGURE 3, it is desired that the converter produce a digital signal representing the number 511 at angular displacements of from zero (0) to thirty (30) degrees and then drop in a step change to number 500 as the drum is displaced from thirty (30) to thirty-five (35) degrees. Thereafter for each suceeding five degree rotative increment, the converter produces a constantly diminishing number according to the inverse function $$Y=\frac{3}{A}$$

until the drum has been rotated a total of 300 degrees displacement whereupon the converter reverts to its initial value of 511 and produces this number from said 300 degrees displacement until the drum has been rotated past its zero degrees or initial position and is again rotated to its 30 degree position.

FIGURE 4(*a*) illustrates the manner of coding the outer periphery of the drum 11 in the binary numbers system to produce this desired inverse function as plotted in FIGURE 3. As shown, the outer periphery of the drum 11 is divided into a plurality of parallel tracks 16*a* to 16*k*, respectively, which are shown as being vertically arranged in the figure but are actually arcuately shaped over the outer surface of the drum 11. In this figure, the darkened or marked areas represent conducting portions on the drum 11 whereas the unmarked areas represent the insulating "islands" as discussed above; and the plurality of dots 22 23*a* . . . 31*a*, 23*b* . . . 31*b*, and 32 disposed generally in two rows transverse to the tracks 16*a* to 16*k*, are employed to represent the fixed locations of the rows of brushes adapted to each make contact with the drum code surface 16.

As shown, the first vertical track 16*a* is made continuously conductive completely around the periphery of the drum and the function of the track 16*a* is to permit energization of the drum with an interrogating potential or signal being introduced by the brush 22 making contact therewith. The tracks 16*b* to 16*j*, respectively, are the numbers tracks, and at each different position along their length may be made either conducting or non-conducting according to the predetermined mathematical function applied to the drum. More specifically, considering the code on the drum at its 20° degree position (uppermost row across the drum) it is noted that each of the tracks are conducting along this row; consequently, when this location of the drum surface is positioned beneath the fixed brushes 22 to 32 and the interrogating brush 22 is energized by a signal, all of the brushes are energized to produce respective one (1) signals as shown by the binary code representation in the first row of the tabulation in FIGURE 4(*a*). Each of the tracks 16*b* to 16*j* therefore represents a different order or place of the binary number. Consequently when the drum is at this position, the binary number 111111111 is produced by the brushes 16*b* to 16*j*, respectively, corresponding to the desired number 511 in the decimal system as indicated in the graph of FIGURE 3 and the tabulation shown in FIGURE 4(*b*).

On the other hand, when the drum 11 has been rotated thirty-five (35°) degrees from it s starting position, the brushes 22 to 32, inclusive, make contact with the drum along the transverse row thereof labeled thirty-five degrees in FIGURE 4(*a*) (fourth row down from the top). In this position only the brushes 22, 23, 24, 26, 28, 29, and 31 make contact with conducting portions thereof, but the remaining number brushes 25, 27, and 30 rest on insulating islands. Consequently, the binary number being produced by the brushes with the drum at this angular displacement is 110101101 equaling in the decimal system the desired number 429, as shown by the tabulation in FIGURE 4(*b*).

Thus in the manner illustrated by the examples given above, it is observed that the outer surface of the drum 11 may be provided with a conducting-nonconducting code pattern in such manner as to enable the detecting brushes to produce a different digital number in the binary code system for each different angular displacement of the drum 11. It is also believed evident from the foregoing that the code 16 may be arranged over the drum surface in any desired predetermined mathematical or empirical function whereby the input analogue quantity (rotative position of the drum) may be converted into digital form and translated into a mathematical function of the input rotation. It is further contemplated according to the present invention, that the analogue quantity may be digitally converted and translated into functions represented in other than the binary code since this involves merely changing the code markings into another form such as cyclic binary, binary decimal, cyclic binary decimal, excess 3, or other as desired.

According to the present invention, there is additionally provided means for insuring that the brushes always read or detect the correct code markings 16 on the drum 11 together with position register control means for transmitting the digital output from the converter brushes only when the various brushes and code markings are in coincident alignment. For example, since the brushes produce either a zero or one (1) signal if the converter is operating in the binary code, it is evident that if any one of the brushes failed to make contact with a conducting area on the drum when such a conducting portion is actually present beneath the brush, or if for other reason such as an open circuit connection, a one (1) signal were not transmitted over any one of the brush wires or pigtails when it should be, the digital output of the converter would be in error by producing a zero signal in that order or place rather than the correct one (1) signal that should be generated. Furthermore, should the drum be angularly positioned in such manner that the brush falls in between code markings in a given track wherein it detects a portion of a conducting marking and a portion of an insulating marking, it is evident that the brush would always transmit a one (1) signal until the brush had entirely lost contact with the conducting portion. In other words, whenever the code marking in any given track changes from a conducting to a non-conducting area or the reverse, the brush must normally pass completely onto the non-conducting area before a zero signal is transmitted since if any portion of the brush contacts a conducting portion, a signal is transmitted to the brush through that conducting portion, even though the brush were substantially reading a non-conducting portion.

To overcome these ambiguities and possibilities of error according to the present invention, there are provided two brushes for reading the code in each number track together with a position registry control brush 32 and an additional position registry track **16*k* on the drum 11** for the purpose of insuring that the numbers brushes perform the necessary detecting function and do so when the numbers brushes are in coincident alignment with the correct code area on the drum surface to be detected.

Referring again to FIGURE 4(*a*) for an understanding of this improved ambiguity- and error-correcting means, the position registry control track **16*k* on the drum surface 16 is provided with a number of equally-spaced conducting and non-conducting areas, as shown, with each adjoining pair of conducting and non-conducting areas occupying one quanta or unit distance along the drum that in the example illustrated is five (5°) degrees along the drum periphery. The brush 32 for detecting the markings on the position registry track 16*k* is fixedly positioned inbetween the two rows of number brushes 23*a* to 31*a*, and 23*b* to 31*b*, respectively, whereby as the drum changes angular position, one row of brushes, such as 23*a* to 31*a* will be detecting the drum in advance of the position of position brush 32 and the other row of brushes 23*b* to 31*b* will be detecting the drum at positions lagging the position brush 32. Each of the brushes is formed to make contact with the drum over an area of ½ quanta or ½ the vertical space occupied by a horizontal row of code markings whereby as the position registry brush 32 first makes contact with a conducting area on the position registry track 16*k*, the lead brushes 23*a* to 31*a*, inclusive, are detecting the drum in advance and well within one quanta space or in correct alignment with one row of code markings and cannot overlap into a preceding row of markings. The other row of brushes 23*b* to 31*b***, inclusive, on the other hand, are positioned in registry with the preceding row of code markings, assuming rotation of the drum in a direction corresponding to a downward direction, FIGURE 4, as indicated by the arrow.

According to the present invention, there is additionally provided a log circuit which responds to the position registry control brush 32 making contact with a conducting area on the position registry track **16*k* to enable the leading brushes 23*a* to 31*a*, to detect the code markings but not the lagging brushes 23*b* to 31*b*; and which alternately responds to the position brush 32 scanning a non-conducting position marking on track 16*k* to enable the lagging brushes 23*b* to 31*b* to scan the code markings but not the leading brushes. In this manner two improved results are obtained. First, each code track is scanned or detected twice; at first by the leading brush in that track, and then later by the lagging brush therein as the drum continues its angular movement. This double scanning of each code marking provides assurance that if one of the number brushes fails to make contact with the drum or for any other reason fails to transmit the correct signal, the other number brush in that track will do so. Secondly, the fact that one number brush in each track leads the position brush whereas the other number brush lags behind it, insures that the number brushes are always in coincident alignment with the number code markings during the scanning thereof. This follows from the fact that the leading number brush is effectively disabled from readout until the position registry brush 32** has first reached a conducting portion of the position control track, at which position, the leading number brush is centrally positioned over either a conducting area on the drum or a non-conducting area but cannot be located intermediate two such areas. As the drum continues its angular movement, the position registry brush detects a non-conducting area on the position registry control track, thereby effectively disabling the leading number brushes from readout and enabling the lagging brush in that track to scan the drum. In this latter position, the lagging number brush is also centrally in alginment with a given code marking on the drum and consequently cannot produce an error or ambiguity.

Thus according to the present invention there is provided a position registry control means to enable scanning of the code on the drum 11 only when the fixed number brushes are centrally aligned with the code markings on the drum thereby insuring that the digital position signals being transmitted by the brushes always correctly reflect the position of the drum and cannot be in error as a result of the brushes being positioned intermediate an adjoining pair of code markings or code spaces on the drum. In addition, each coded position on the drum or quanta is scanned twice in sequence as the drum is rotated, further insuring against errors in the transmission of the digital output signals.

FIGURE 5 illustrates in block diagram form a preferred logic circuit for responding to the position brush 32 and the number brushes 23 to 31, inclusive, in such manner as to perform the functions as described above. As shown, the signal from the position registry control brush 32 is directed over an input line 35 to a first "and" circuit 36 and is also directed through an inverter circuit 37 to energize a second "and" circuit 38. The first "and" circuit 36 also responds to the output signal from the leading brush **23*a* reading numbers track 16*b* on the drum, and is adapted to produce a binary one (1) signal only when both the leading brush 23*a* and the position registry brush 32 are both detecting a conducting area on the drum. Referring again to the code shown in FIGURE 3, it is noted that as the position registry control brush 32** first detects a conducting area on position track 16*k*, the leading brush 23*a* is positioned well into the next quanta and will detect either a conducting area or non-conducting area depending upon the angular position of the drum 11. If the brush 23*a* detects a conducting area, it will transmit a binary one (1) signal and if it detects a non-conducting area, it will transmit a binary zero signal. Consequently as the position brush 32 detects a conducting area on position control track 16*k* and transmits a binary one (1) signal to "and" circuit 36, the "and" circuit 36 in responding to numbers brush 23*a*, produces a binary 1 signal over line 39 if the numbers brush 23*a* is detecting a conducting area on the drum or a binary zero signal over line 39 if the number brush 23*a* is detecting a non-conducting area on the drum. Conversely after the drum has changed angular position whereby the position registry brush 32 detects the next succeeding non-conducting area on track 16*k*, the brush 32 transmits a binary zero signal to the "and" circuit 36 and the "and" circuit 36 is accordingly disabled from responding to the signal leading number brush 23*a* since it can only transmit a binary 1 signal when both the position control brush 32 and the leading brush 23*a* are both detecting conducting areas on the drum.

However the signal from the position control brush 32 is also directed through an inverter circuit 37 which functions to invert or reverse the signal received from the position control brush 32 and energize the second "and" circuit 38 with this reversed signal. That is, if the inverter circuit receives a binary one (1) signal it transmits a binary zero signal to the second "and" circuit 38, whereas if it receives a binary zero signal, it transmits a binary one (1) signal to the second "and" circuit 38. Consequently, as the position control brush 32 scans or detects a non-conducting area on the drum surface 16, it energizes the second "and" circuit with a binary one (1) signal thereby conditioning the second "and" circuit to respond to the lagging number brush 23*b* in the same code track 16*b*. If the lagging number brush 23*b* is also detecting a conducting area on the drum surface 16, the second "and" circuit 38 produces a binary one (1) signal over its output line 40, whereas if it is detecting a non-conducting area on the drum, it produces a binary zero signal. The output signals from "and" circuits 36 and 38 being directed over lines 39 and 40 are both transmitted to an "or" circuit 41 which responds to a binary one (1) signal over either line to transmit the same over its output line 42. More specifically the "or" circuit 41 transmits a binary one (1) signal whenever the signals over either input line 39 or 40 is binary one (1) or when both are binary one (1), and only transmits a binary zero signal when the signals over both lines 39 and 40 are binary zero.

Recapitulating, the operation of the logic circuit of FIGURE 5, the position registry control brush 32 transmits its detected signal to "and" circuit 36 and the opposite of its detected signal to "and" circuit 38. "And" circuit 36 also responds to the signal from leading number brush 23*a* (in track 16*b*) and "and" circuit 38 also responds to the signal from the lagging number brush 23*b* in the same track. The function of the "and" circuits is to enable the sequential scanning of the two number brushes 23*a* and 23*b*, whereby as the position control brush 32 detects a conducting area on the drum, the "and" circuit 36 responds to lead number brush 23*a* and when the position control brush 32 detects a non-conducting area on the drum, the "and" circuit 38 responds to the lag number brush 23*b*. Consequently the combination of the inverter circuit 37, the two "and" circuits 36 and 38 and the "or" circuit 41 provide a logic means to enable the leading and lagging number brushes located on track 16*b* on the drum to sequentially scan or detect the code markings on the drum track and to do so only when the brushes are properly positioned with respect to the code markings, thereby to eliminate errors or ambiguities in the readout.

As shown in FIGURE 5, there is provided a plurality of such logic circuit means, one for each track on the drum 11 and each being identical in structure and operation with the circuit as described above for track 16*b*. However, it is believed evident that only one inverter circuit 37 is required to transmit opposite binary signals to all the lagging number brush "and" circuits.

Since the above and many other modifications are considered within the skill of those versed in the art after a detailed consideration of the foregoing specification, this invention is to be limited only by the following claims.

What is claimed is:

1. An analog-to-digital converter comprising:

a coded member having a surface bearing a plurality of electrically conductive and non-conductive unit areas arranged in a pattern defined by a number system code of the binary type, said pattern including a number of parallel columns of differing digital significance and a number of parallel rows extending transversely of the columns;

an additional column on said coded member made up of alternating conductive and non-conductive ones of such unit areas correlated to respective rows of said pattern;

sensing means, movable relative to said coded member in the direction of the columns of said code pattern, made up of an array of individual sensors extending transversely of said columns, said array including a single sensor aligned with said additional column and a respective pair of sensors aligned with each column of said pattern, one sensor of each pair being in advance of, and the other behind, said single sensor, with respect to the direction of relative movement of said coded member and sensing means;

means applying an electrical input to the conductive unit areas of said coded member; and logic circuit means for deriving output signal from that sensor of each of said pairs which is sensing a conductive unit area of said code pattern when said single sensor is sensing a conductive unit area of said additional column and from that sensor of each of said pairs which is sensing a conductive unit area of said code pattern when said single sensor is sensing a non-conductive unit area of said additional column, wherein said logic circuit means comprising, for each said pair of sensors, a signal inverter, a pair of "and" gates and an "or" gate, each gate having a pair of input terminals and an output terminal, the output terminal of each "and" gate being electrically connected to a respective input terminal of the "or" gate, said single sensor being electrically connected directly to one input terminal of one of said "and" gates and through said inverter to one input terminal of the other of said "and" gates, one sensor of each said pair being electrically connected to the other input terminal of a respective one of said "and" gates.

2. An analog-to-digital converter comprising:

a coded member having a surface bearing a plurality of electrically conductive and non-conductive unit areas arranged in a pattern defined by a number system code of the binary type, said pattern including a number of columns of differing digital significance and a number of rows extending transversely of the columns;

an additional column on said coded member made up of alternating conductive and non-conductive ones of such unit areas correlated to respective rows of said pattern;

sensing means, movable relative to said coded member in the direction of the columns of said code pattern, made up of an array of individual sensors extending transversely of said columns, said array including a single sensor aligned with said additional column and a pair of sensors aligned with each column of said code pattern, one sensor of each pair being in advance of, and the other behind, said single sensor, with respect to the direction of relative movement of said coded member and sensing means;

means applying an electrical input to the conductive unit areas of said coded member; and logic circuit means for deriving output signals from said sensors representative of the position of said code member relative to said sensing means, said logic circuit means including:

a pair of "and" gates and an "or" gate for each column of said code pattern, each said gate having a pair of input terminals and an output terminal, the output terminals of each pair of "and" gates being electrically connected to a respective input terminal of a respective "or" gate;

means electrically connecting each sensor of each said pair of sensors to one of the input terminals of the "and" gates of a respective pair;

means electrically connecting said single sensor directly to the other input terminal of one "and" gate of each said pair;

a respective signal inverter in series with the other input terminal of the other "and" gate of each said pair; and means electrically connecting said single sensor to each said signal inverter.

3. An analog-to-digital converter comprising:

a coded member having a surface bearing a plurality of electrically conductive and non-conductive unit areas of identical size and shape and uniform orientation arranged in a pattern defined by a number system code of the binary type, said pattern including a number of columns of differing digital significance and a number of rows extending transversely of the columns, the column-wise extent of said rows being established by and equal to twice the column-wise dimension of said unit areas;

an additional column on said coded member made up of alternating conductive and non-conductive ones of such unit areas, the unit areas of said columns and the additional column being laterally aligned in said rows;

sensing means, movable relative to said coded member in the direction of the columns of said code pattern, made up of an array of individual sensors extending transversely of said columns, said array including a single sensor aligned with said additional column and a pair of sensors aligned with each column of said pattern, one sensor of each pair being in advance of, and the other behind, said single sensor, with respect to the direction of relative movement of said coded member and sensing means;

means applying an electrical input to the conductive unit areas of said coded member; and logic circuit means for deriving output signals from said sensors representative of the position of said code member relative to said sensing means, said logic circuit means consisting of, for each said pair of sensors:

a signal inverter, a pair of "and" gates and an "or" gate, each gate having a pair of input terminals and an output terminal, the output terminal of each "and" gate being electrically connected to a respective input terminal of the "or" gate, said single sensor being electrically connected directly to one input terminal of one of said "and" gates and through said inverter to one input terminal of the other of said "and" gates, one sensor of each said pair being electrically connected to the other input terminal of a respective one of said "and" gates.

References Cited in the file of this patent

UNITED STATES PATENTS

| | | |
|---|---|---|
| 2,750,584 | Goldfischer | June 12, 1956 |
| 2,866,184 | Gray | Dec. 23, 1958 |
| 2,873,440 | Speller | Feb. 10, 1959 |
| 2,880,410 | Postman | Mar. 31, 1959 |
| 3,003,142 | Wolinsky | Oct. 3, 1961 |